(12) United States Patent
Sibik

(10) Patent No.: US 9,746,228 B2
(45) Date of Patent: Aug. 29, 2017

(54) METHODS AND SYSTEMS FOR CONTROLLING A CHILLER SYSTEM HAVING A CENTRIFUGAL COMPRESSOR WITH A VARIABLE SPEED DRIVE

(71) Applicant: TRANE INTERNATIONAL INC., Piscataway, NJ (US)

(72) Inventor: Lee L. Sibik, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

(21) Appl. No.: 14/763,455

(22) PCT Filed: Jan. 24, 2014

(86) PCT No.: PCT/US2014/013039
§ 371 (c)(1),
(2) Date: Jul. 24, 2015

(87) PCT Pub. No.: WO2014/117013
PCT Pub. Date: Jul. 31, 2014

(65) Prior Publication Data
US 2015/0362240 A1    Dec. 17, 2015

Related U.S. Application Data

(60) Provisional application No. 61/756,695, filed on Jan. 25, 2013.

(51) Int. Cl.
*F25B 49/02*    (2006.01)
*F04B 49/08*    (2006.01)
(Continued)

(52) U.S. Cl.
CPC .......... *F25B 49/022* (2013.01); *F04B 49/08* (2013.01); *F04B 49/103* (2013.01);
(Continued)

(58) Field of Classification Search
CPC .................. F25B 49/022; F25B 49/025; F25B 2600/025; F25B 2600/0262
See application file for complete search history.

(56) References Cited

U.S. PATENT DOCUMENTS 4,151,725 A * 5/1979 Kountz ................. F25B 49/022
417/19
4,282,718 A * 8/1981 Kountz ................. F25B 49/022
62/115

(Continued)

FOREIGN PATENT DOCUMENTS

JP     2006284058 A * 10/2006
KR  10-2005-0028922     3/2005

OTHER PUBLICATIONS

JP 2006284058 Abstract Translation.*

(Continued)

*Primary Examiner* — Etsub Berhanu
*Assistant Examiner* — Nelson Nieves
(74) *Attorney, Agent, or Firm* — Hamre, Schumann, Mueller & Larson, P.C.

(57) ABSTRACT

Methods and systems for controlling a chiller system to achieve control stability while maintaining optimum efficiency. Particularly, methods and systems for controlling a centrifugal compressor speed and an inlet guide vane position that establishes three distinct regions in the control path: (i) during initial unloading from full load, the inlet guide vane position is kept at a fully open position while the centrifugal compressor speed is changed to achieve the desired cooling capacity; (ii) between an inflection point and a transition point, keeping the centrifugal compressor speed constant while the inlet guide vane position is changed to achieve the desired cooling capacity; and (iii) between the transition point and zero cooling capacity, changing both the (Continued)

inlet guide vane position and the centrifugal compressor speed to achieve the desired cooling capacity.

9 Claims, 9 Drawing Sheets

(51) Int. Cl.
  *F04B 49/10* (2006.01)
  *F04D 27/02* (2006.01)
(52) U.S. Cl.
  CPC ..... *F04D 27/0246* (2013.01); *F04D 27/0261* (2013.01); *F25B 2339/047* (2013.01); *F25B 2600/0262* (2013.01); *F25B 2700/195* (2013.01); *F25B 2700/197* (2013.01); *F25B 2700/21161* (2013.01); *F25B 2700/21172* (2013.01); *F25B 2700/21173* (2013.01)

(56) References Cited

U.S. PATENT DOCUMENTS

| | | | |
|---|---|---|---|
| 4,355,948 A | 10/1982 | Kountz et al. | |
| 4,589,060 A * | 5/1986 | Zinsmeyer | F25B 49/022 62/201 |
| 4,608,833 A * | 9/1986 | Kountz | F25B 49/022 62/201 |
| 4,646,534 A | 3/1987 | Russell | |
| 4,686,834 A | 8/1987 | Haley et al. | |
| 4,689,967 A * | 9/1987 | Han | F25B 49/022 62/201 |
| 5,355,691 A | 10/1994 | Sullivan et al. | |
| 5,537,830 A | 7/1996 | Goshaw et al. | |
| 5,553,997 A | 9/1996 | Goshaw et al. | |
| 5,947,680 A | 9/1999 | Harada et al. | |
| 6,202,431 B1 * | 3/2001 | Beaverson | F25B 49/02 62/196.3 |
| 6,244,058 B1 * | 6/2001 | Duga | F25B 39/02 62/177 |
| 6,434,960 B1 * | 8/2002 | Rousseau | F25B 49/025 62/228.4 |
| 2005/0160748 A1 | 7/2005 | Shaffer et al. | |
| 2006/0010893 A1 * | 1/2006 | Dominguez | F24F 3/06 62/201 |
| 2009/0024257 A1 | 1/2009 | Crane et al. | |
| 2010/0024456 A1 * | 2/2010 | Ueda | F04D 27/0269 62/228.1 |
| 2011/0048046 A1 * | 3/2011 | Sommer | F25B 1/053 62/228.1 |
| 2012/0055184 A1 | 3/2012 | Ueda | |

OTHER PUBLICATIONS

International Search Report and Written Opinion for International Application No. PCT/US2014/013039, Dated May 22, 2014, 11 pgs.

* cited by examiner

METHODS AND SYSTEMS FOR CONTROLLING A CHILLER SYSTEM HAVING A CENTRIFUGAL COMPRESSOR WITH A VARIABLE SPEED DRIVE

FIELD OF TECHNOLOGY

The embodiments disclosed herein relate generally to a heating, ventilation, and air-conditioning ("HVAC") system, such as a chiller system, that has a centrifugal compressor. More particularly, the embodiments relate to methods and systems for controlling the chiller system to achieve control stability while maintaining optimum efficiency.

BACKGROUND

Chiller systems typically incorporate the standard components of a refrigeration loop to provide chilled water for cooling a designated building space. A typical refrigeration loop includes a compressor to compress refrigerant gas, a condenser to condense the compressed refrigerant to a liquid, and an evaporator that utilizes the liquid refrigerant to cool water. The chilled water can then be piped to the space to be cooled.

Chiller systems that utilize so called centrifugal compressors can typically range in size, for example, from ~100 to ~10,000 tons of refrigeration, and can provide certain advantages and efficiencies when used in large installations such as commercial buildings. The reliability of centrifugal chillers can be high, and the maintenance requirements can be low, as centrifugal compression typically involves the purely rotational motion of only a few mechanical parts.

A centrifugal compressor typically has an impeller that can be thought of as a fan with many fan blades. The impeller typically is surrounded by a duct. The refrigerant flow to the impeller can be controlled by variable inlet guide vanes ("IGV"s) located in the duct at the inlet to the impeller. The inlet guide vanes can operate at an angle to the direction of flow and cause the refrigerant flow to swirl just before entering the compressor impeller. The angle of the inlet guide vanes can be variable with respect to the direction of refrigerant flow. As the angle of the inlet guide vanes is varied and the inlet guide vanes open and close, the refrigerant flow to the compressor can be increased or decreased. In many applications, the inlet guide vanes can be variable ninety degrees between a fully closed position perpendicular to the direction of the refrigerant flow to a fully open inlet vane guide position in which the inlet guide vanes are aligned with the refrigerant flow. When the cooling load is high, the inlet guide vanes can be opened to increase the amount of refrigerant drawn through the evaporator, thereby increasing the operational cooling capacity of the chiller.

In order to meet all conditions of demand in the air conditioned space, the chiller system can vary the output capacity. At times of high cooling demand, the centrifugal compressor can run at maximum load or full capacity. At other times the need for air conditioning is reduced and the centrifugal compressor can be run at a reduced capacity. The output of the chiller system then can be substantially less than the output at full capacity. It is also desired to operate the centrifugal compressor at the most efficient mode for the capacity that is required at any given time in order to reduce the electrical consumption of the chiller system to the lowest possible amount for the given load. The most efficient point of operation for a centrifugal compressor has been found to be near a condition known as surge. Operation in the surge condition, however, can be undesirable as this can cause damage to the centrifugal compressor.

SUMMARY

Embodiments are provided for controlling a chiller system having a centrifugal compressor using a variable speed drive. In particular, the embodiments disclosed herein relate to methods and systems for controlling the chiller system to achieve control stability while maintaining optimum efficiency.

As discussed above, centrifugal chillers are most efficient when operated near a condition known as surge. At surge, a point is reached where, for the desired cooling output, the pressure differential between the refrigerant immediately at the outlet of the impeller and the pressure of the refrigerant at the inlet of the impeller is large. In this condition, the refrigerant will surge, flowing first backward and then forward through the centrifugal compressor. This creates an unstable operating condition.

In some embodiments, methods and systems for controlling a chiller system to achieve control stability while maintaining optimum efficiency are provided. Particularly, methods and systems for controlling a centrifugal compressor speed and an inlet guide vane position that establishes three distinct regions in the control path: (i) during initial unloading from full load, the inlet guide vane position is kept at a fully open position while the centrifugal compressor speed is changed to achieve the desired cooling capacity; (ii) between an inflection point and a transition point, keeping the centrifugal compressor speed constant while the inlet guide vane position is changed to achieve the desired cooling capacity; and (iii) between the transition point and zero cooling capacity, changing both the inlet guide vane position and the centrifugal compressor speed to achieve the desired cooling capacity.

In some embodiments, a desired capacity command is determined by a capacity control component of a chiller control unit. An actuator control component determines a centrifugal compressor speed and an inlet guide vane position of a centrifugal compressor to achieve optimum efficiency of the chiller system based on the desired capacity command determined by the capacity control component.

In some embodiments, the desired capacity command can be based on an evaporator leaving water temperature measurement and an evaporator entering water temperature measurement.

Also, in some embodiments, the speed of the centrifugal compressor and the inlet guide vane position can be determined based on the desired capacity command, the evaporator leaving water temperature, a condenser entering water temperature, a saturated evaporator temperature, and a condenser pressure.

Further, in some embodiment, the centrifugal compressor and the inlet guide vane position can be determined based on a three stage control process, whereby the chiller control unit initially operates the chiller system by starting the centrifugal compressor speed, via variable speed drive (VSD) (e.g., a variable frequency drive ("VFD")), at a maximum centrifugal compressor speed and setting the inlet guide vane at a fully open inlet guide vane position. Then, the desired normalized chiller capacity can be reached by varying the centrifugal compressor speed while keeping the inlet guide vane position fully open until the desired chiller capacity drops below a transition point T*. When the desired normalized chiller capacity drops below the transition point T*, the desired normalized chiller capacity can be reached by varying the inlet guide vane position while keeping the centrifugal compressor speed constant until the desired normalized chiller capacity drops below an inflection point C*. When the desired normalized chiller capacity drops below the inflection point C*, the desired normalized chiller capacity can be reached by varying the centrifugal compressor speed and the inlet vane guide position at the same time.

In another embodiment, the centrifugal compressor and the inlet guide vane position can be determined based on a two stage control process, whereby the chiller control unit initially operates the chiller system by setting the centrifugal compressor speed, via the VSD, at a maximum centrifugal compressor speed and setting the inlet guide vane at a fully open inlet guide vane position. Then, the desired normalized chiller capacity can be reached by varying the centrifugal compressor speed while keeping the inlet guide vane position fully open until the desired normalized chiller capacity drops below the inflection point C*. When the desired normalized chiller capacity drops below the inflection point C*, the desired normalized chiller capacity can be reached by varying the centrifugal compressor speed and the inlet vane guide position at the same time.

In yet another embodiment, the centrifugal compressor and the inlet guide vane position can be determined based on a two stage control process, whereby the chiller control unit initially operates the chiller system by setting the centrifugal compressor speed, via the VSD, at a maximum centrifugal compressor speed and setting the inlet guide vane at a fully open inlet guide vane position. Then, the desired normalized chiller capacity can be reached by varying the centrifugal compressor speed while keeping the inlet guide vane position fully open until the desired normalized chiller capacity drops below the transition point T*. When the desired normalized chiller capacity drops below the transition point T*, the desired normalized chiller capacity can be reached by varying the centrifugal compressor speed and the inlet vane guide position at the same time.

Accordingly, the embodiments described herein provide an improved capacity control system of a centrifugal chiller wherein the centrifugal compressor speed and inlet guide vane position can be adjusted to the most efficient operating point while at the same time avoiding a surge condition.

Other features and aspects of the methods and systems for controlling the chiller system to achieve control stability while maintaining optimum efficiency will become apparent by consideration of the following detailed description and accompanying drawings.

BRIEF DESCRIPTION OF THE DRAWINGS

Referring now to the drawings in which like reference numbers represent corresponding parts throughout.

DETAILED DESCRIPTION

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

Embodiments are provided for controlling a chiller system having a centrifugal compressor using a VSD (e.g., a VFD). In particular, the embodiments disclosed herein relate to methods and systems for controlling the chiller system to achieve control stability while maintaining optimum efficiency.

While the embodiments described below use a variable frequency drive to control a centrifugal compressor speed of a centrifugal compressor, it will be appreciated that other types of variable speed drives may be used to control the centrifugal compressor speed of the centrifugal compressor.

Figure 1:
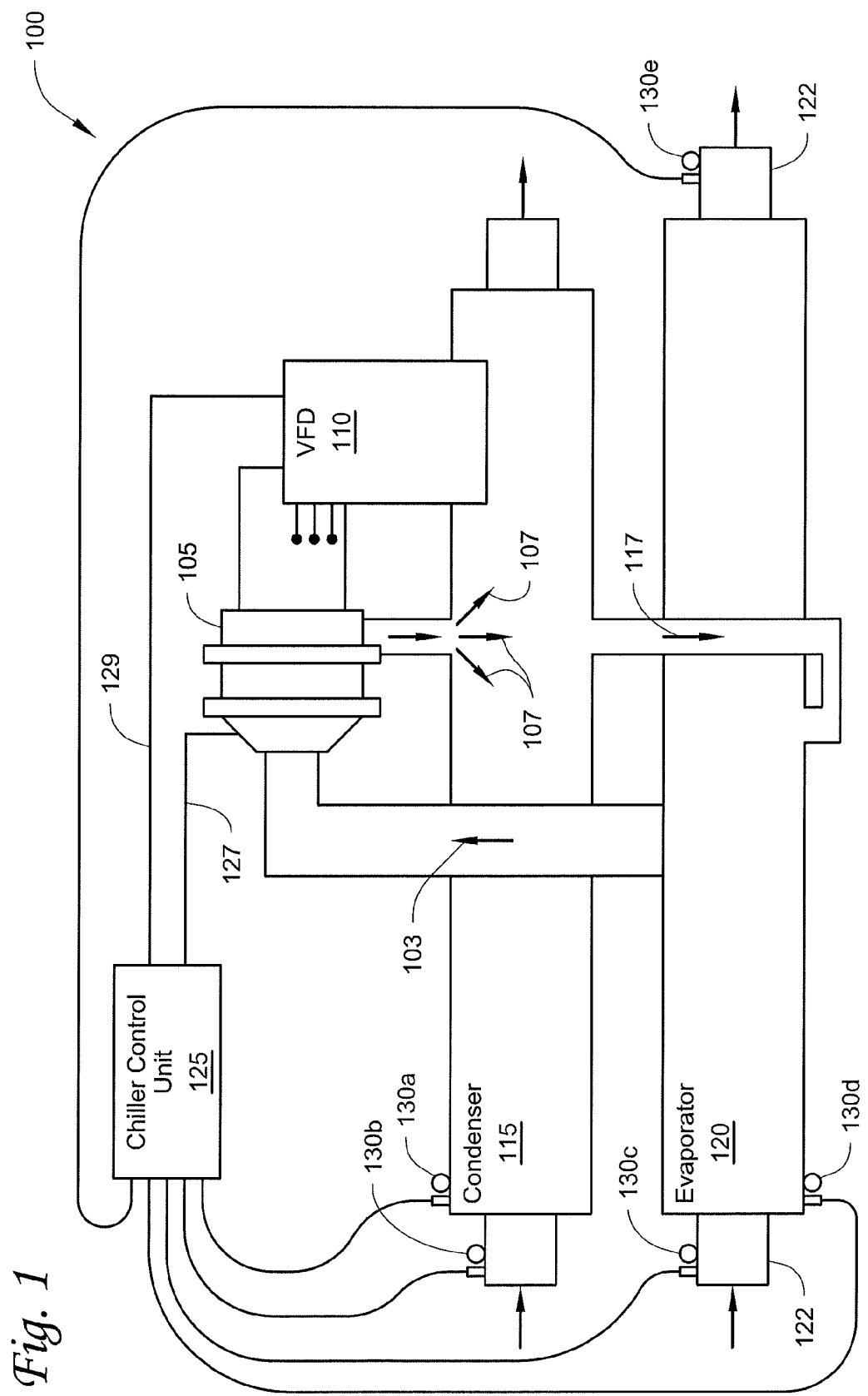
FIG. 1 illustrates a block diagram of a chiller system, according to one embodiment.

FIG. 1 illustrates a block diagram of a chiller system 100 according to one embodiment. The chiller system includes a centrifugal compressor 105 having a VFD 110, a condenser 115, an evaporator 120 and a chiller control unit 125.

As generally shown in FIG. 1, the centrifugal compressor 105 is configured to compress refrigerant gas. The compressed refrigerant is then sent (shown by arrows 107) to the condenser 115. The condenser 115 condenses the compressed refrigerant into a liquid refrigerant. The liquid refrigerant is then sent (shown by arrow 117) to the evaporator 120. The evaporator 120 uses the liquid refrigerant to cool water flowing, via the piping 122, through the evaporator 120. The chilled water can then be piped into a space to be cooled. As the liquid refrigerant cools the water passing through the evaporator 120, the liquid refrigerant transforms into a gas, and the refrigerated gas (shown by arrow 103) is then returned to the centrifugal compressor 105.

The chiller control unit 125 is configured to monitor operation of the chiller system 100 using measurement data obtained from a plurality of sensors 130a-e and control operation of the chiller system 100 based on changes in the load demanded by the air conditioning requirements of the space that is being cooled. The chiller control unit 125 can adjust for changes in the load demanded by the air conditioning requirements of the space that is being cooled by controlling the volume of refrigerant flow through the centrifugal compressor 105. This can be accomplished by varying the position of inlet guide vanes (not shown) of the centrifugal compressor 105 and a compressor speed of the centrifugal compressor 105, either separately or in a coordinated manner.

In particular, the chiller control unit 125 is configured to control operation of the centrifugal compressor 105 and the VFD 110 by sending an inlet guide vane command 127 to the centrifugal compressor 105 to control the position of the inlet guide vanes and by sending a compressor speed signal 129 to the VFD 110 to control the compressor speed of the centrifugal compressor 105. Specific details of the operation of the chiller control unit 125 are discussed below with respect to FIG. 2.

Each of the plurality of sensors 130*a-e* is connected to the chiller control unit 125 and is configured to monitor a certain aspect of the chiller system 100 and send measurement data to the chiller control unit 125. The sensor 130*a* monitors a condenser refrigerant pressure. The sensor 130*b* monitors a condenser entering water temperature. The sensor 130*c* monitors an evaporator entering water temperature. The sensor 130*d* monitors an evaporator refrigerant temperature. The sensor 130*e* monitors an evaporator leaving water temperature.

Figure 2:
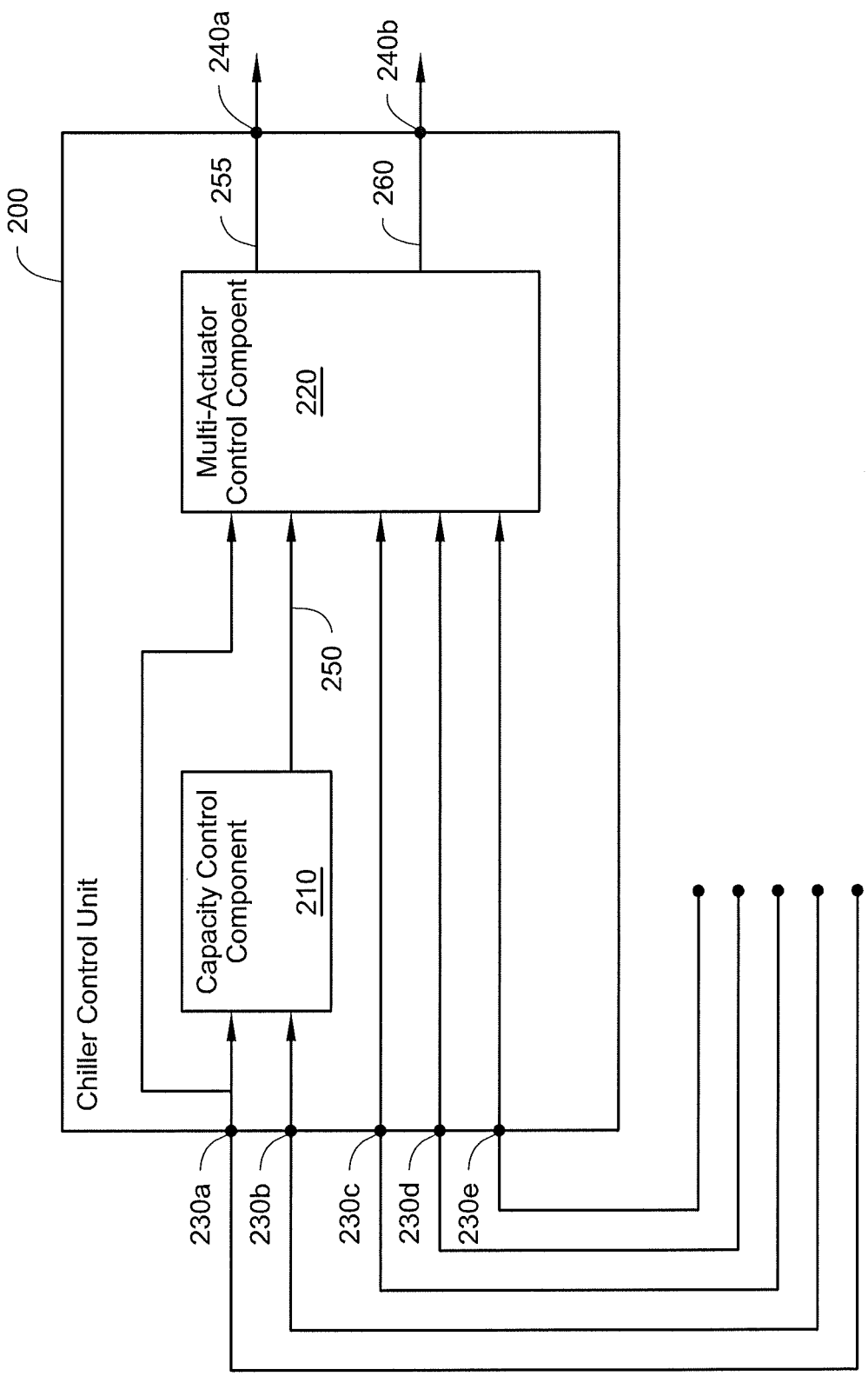
FIG. 2 illustrates a block diagram of a chiller control unit, according to one embodiment.

FIG. 2 illustrates one embodiment of a block diagram of a chiller control unit 200 for use in a chiller system, such as the chiller system 100 shown in FIG. 1. The chiller control unit 200 is configured to monitor operation of the chiller system and control operation of the chiller system based on changes in the load demanded by the air conditioning requirements of the space that is being cooled.

The chiller control unit 200 generally can include a processor and a memory. The chiller control unit 200 also includes a capacity control component 210 and a multi-actuator control component 220 that are configured to process information using the processor based on one or more algorithms stored in the memory.

The chiller control unit 200 includes a plurality of inputs 230*a-e* and a plurality of outputs 240*a-b*. The plurality of inputs 230*a-e* is configured to receive measurement data from, for example, a plurality of sensors in the chiller system (such as the plurality of sensors 130*a-e* shown in FIG. 1). In one embodiment, for example, the input 230*a* can be configured to receive measurement data regarding an evaporator leaving water temperature; the input 230*b* can be configured to receive measurement data regarding an evaporator entering water temperature; the input 230*c* can be configured to receive measurement data regarding a condenser entering water temperature; the input 230*d* can be configured to receive measurement data regarding an evaporator refrigerant temperature; and the input 230*e* can be configured to receive measurement data regarding a condenser refrigerant pressure.

The plurality of outputs 240*a-b* is configured to send command signals to one or more components of the chiller system including, for example, a compressor (such as the centrifugal compressor 105 and the VFD 110 shown in FIG. 1). In particular, the output 240*a* can be configured to send a centrifugal compressor speed command 255 to, for example, a VFD of the chiller system and the output 240*b* can be configured to send an inlet guide vane command 260 to, for example, a centrifugal compressor of the chiller system.

The capacity control component 210 is configured to receive measurement data from inputs 230*a* and 230*b* and send a relative chiller capacity (also referred to herein as a desired chiller capacity) command 250 to the multi-actuator control component 220. The relative chiller capacity command 250 is indicative of load demanded by, for example, the air conditioning requirements of the space that is being cooled by the chiller system. In one embodiment, the capacity control component 210 is configured to receive evaporator leaving water temperature and evaporator entering water temperature measurement data via the inputs 230*a* and 230*b* respectively in order to determine the relative chiller capacity command 250.

The multi-actuator control component 220 is configured to receive measurement data from inputs 230*a*, 230*c*, 230*d* and 230*e*, receive the capacity command 250, and output the centrifugal compressor speed command 255 and the inlet guide vane command 260. The centrifugal compressor speed command 255 and the inlet guide vane command 260 are provided to adjust operation of the centrifugal compressor and the VFD of the chiller system to accommodate the load demand while maintaining optimum efficiency and preventing surge.

In one embodiment, the multi-actuator control component 220 is configured to receive evaporator leaving water temperature, condenser entering water temperature, saturated evaporator temperature and condenser pressure measurement data via the inputs 230*a*, 230*c*, 230*d* and 230*e* respectively, and the relative chiller capacity command 250. With this information, the multi-actuator control component 220 is configured to determine the centrifugal compressor speed command 255 and the inlet guide vane command 260 and send the commands 255, 260 out of the chiller control unit 200 via the outputs 240*a*, 240*b* respectively.

Figure 3:
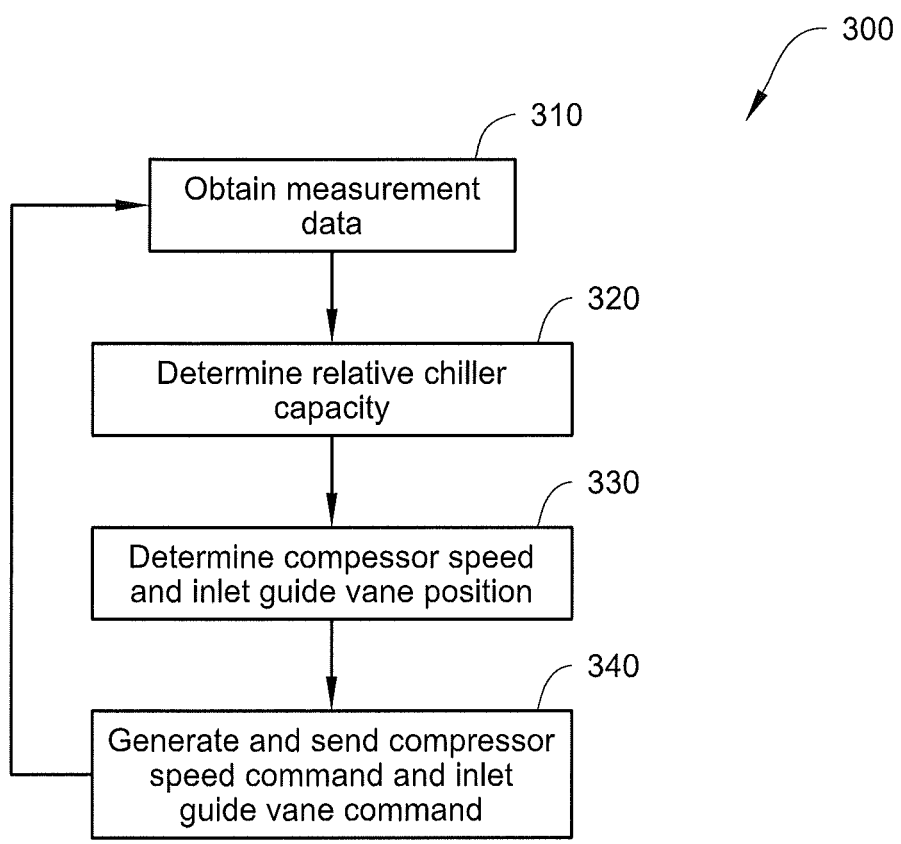
FIG. 3 illustrates a flowchart of a process for operating a chiller system, according to one embodiment.

Processes for determining the centrifugal compressor speed command 255 and the inlet guide vane command 260 via chiller control unit 200 are now described. FIG. 3 illustrates one embodiment of a flowchart of a process 300 for controlling a chiller system, such as the chiller system 100, via the chiller control unit 200, to achieve control stability (e.g. prevent surge) while maintaining optimum efficiency.

The process 300 begins at 310 whereby the chiller control unit 200 receives measurement data from the inputs 230*a-e*. In particular, the chiller control unit 200 receives an evaporator leaving water temperature measurement from the input 230*a*, an evaporator entering water temperature measurement from the input 230*b*, a condenser entering water temperature measurement from the input 230*c*, an evaporator refrigerant temperature from the input 230*d*, and a condenser refrigerant pressure measurement from the input 230*e*. The process 300 then proceeds to 320.

At 320, the capacity control component 210 determines the relative chiller capacity based on the evaporator leaving water temperature measurement and the evaporator entering water temperature measurement. The process 300 then proceeds to 330.

At 330, the multi-actuator control component 220 determines a centrifugal compressor speed and an inlet guide vane position based on the evaporator leaving water temperature, the condenser entering water temperature, the evaporator refrigerant temperature and the condenser refrigerant pressure. The specific processes for determining the centrifugal compressor speed and the inlet guide vane position to achieve control stability while maintaining optimum efficiency are discussed below. In some embodiments, the multi-actuator control component 220 determines the centrifugal compressor speed and the inlet guide vane position by following one of the control paths $A_1$, $A_2$ and $A_3$ described in detail below. The process 300 then proceeds to 340.

At 340, the chiller control unit 200 generates the inlet guide vane command 260 and the centrifugal compressor speed command 255 based on the determined centrifugal compressor speed and the inlet guide vane position. The chiller control unit 200 then sends the inlet guide vane command 260 to inlet guide vanes of a centrifugal compressor of the chiller system and sends the centrifugal compressor speed command 255 to a VFD of the chiller system. The process 300 then proceeds back to 310.

Details regarding how the multi-actuator control component 220 determines the centrifugal compressor speed and the inlet guide vane position at 330 in order to achieve control stability while maintaining optimum efficiency are now described.

The multi-actuator control component 220 determines the centrifugal compressor speed and the inlet guide vane position at a relative chiller capacity command 250 can be based on a mathematical model that defines the relationship between the inputs to the multi-actuator control component 220 (e.g., the evaporator leaving water temperature, the condenser entering water temperature, the evaporator refrigerant temperature, the condenser refrigerant pressure and the relative chiller capacity command) and the centrifugal compressor speed command and the inlet guide vane position.

The mathematical model includes a capacity model and a multi-actuator control model. The capacity model determines centrifugal compressor and initial inlet guide vane position pairs that can generate the desired chiller capacity (e.g., the relative chiller capacity command) at given conditions of the chiller system (e.g., the evaporator leaving water temperature, the condenser entering water temperature, the evaporator refrigerant temperature, the condenser refrigerant pressure). The multi-actuator control model determines the centrifugal compressor speed and inlet guide vane position pair that can yield the relative chiller capacity at the lowest possible power consumption that avoids the possibility of a surge.

The capacity model is now described. It has been found that a simple relationship can be used to show the relationship between centrifugal compressor speed and desired normalized chiller capacity. This relationship can be defined as:

$$\text{Speed} = a \times C^2 + b,$$

where Speed is the centrifugal compressor speed C is the desired normalized chiller capacity and variables a and b are coefficients.

Figure 4:
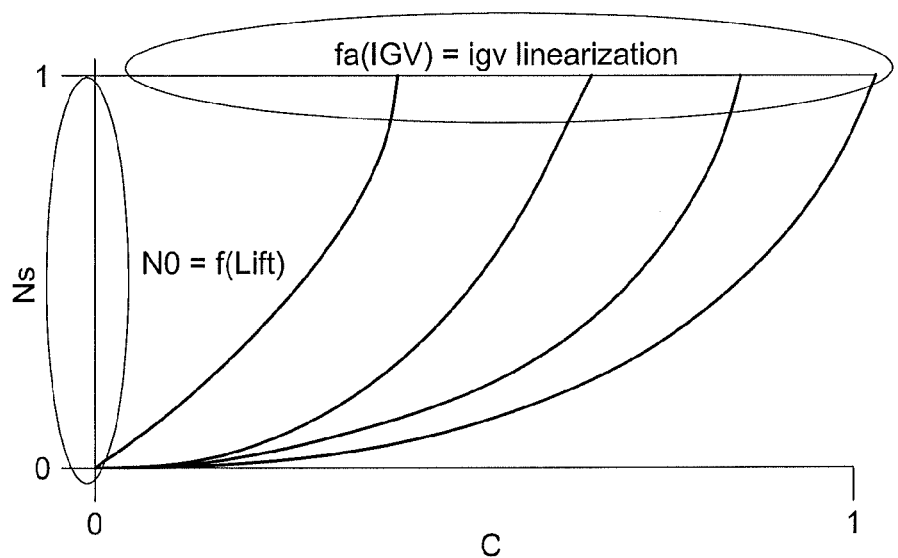
FIG. 4 illustrates inlet guide vane curves along a normalized centrifugal compressor speed versus a desired normalized chiller capacity C plot.

Solving for coefficients a and b can be achieved by setting the capacity to 0 tons and the Speed to a maximum centrifugal compressor speed. As shown in FIG. 4, at 0 tons all inlet guide vane curves converge to a single value $N_0$. This convergence point can vary with lift as defined by the relationship:

$$b = N_0 = f_b(\text{Lift}),$$

where lift can be defined as either: i) a difference between the condenser entering water temperature and the evaporator leaving water temperature; or ii) a difference in saturated refrigerant temperature between the evaporator and the condenser of the chiller system. The particular definition of lift that is used can depend upon which definition is found to be more consistent between chiller system sizes.

When setting the Speed to a maximum possible centrifugal compressor speed and solving for coefficient a provides the following relationship:

$$a = \frac{N_{max} - N_0}{\text{Tons}^2} = \frac{N_{max} - N_0}{f_a(IGV)^2 \cdot MaxTons^2}$$

where $N_{max}$ is a normalized maximum possible centrifugal compressor speed. The desired normalized chiller capacity C can be defined by the relationship:

$$C = \frac{\text{Tons}}{MaxTons}$$

and the normalized centrifugal compressor speed $N_s$ can be defined by the relationship:

$$Ns = \frac{\text{Speed} - N_0}{N_{max} - N_0}$$

The function $f_a(IGV)$ is the linearization curve for converting the desired normalized chiller capacity command to an inlet guide vane position. By combining the above relationships, the normalized centrifugal compressor speed $N_s$ can be determined using the relationship:

$$N_s = \frac{C^2}{f_a(IGV)^2}$$

The multi-actuator control model is now described. As the capacity model described above can have an infinite number of solutions, an additional constraint is provided to obtain a unique solution. It has been found that the optimum efficiency for a chiller system using a centrifugal compressor is when the chiller system operates near a surge boundary. The surge boundary can be defined by a pressure coefficient Pc.

The pressure coefficient Pc is generally a non-dimensional performance parameter used to define centrifugal compressor operation. That is, the pressure coefficient Pc can be a dynamic measurement of the centrifugal compressor that represents a relationship between a static pressure and kinetic energy of the centrifugal compressor. Thus, the pressure coefficient Pc can be used to determine a surge potential of a centrifugal compressor at a given operating condition. It has been found that the higher the pressure coefficient Pc, the greater the potential for a surge. Thus, the efficiency of the chiller system can be increased as the pressure coefficient approaches surge. The pressure coefficient can be determined using the following relationship:

$$PC = \frac{144 \cdot 778\, g_c}{\pi^2 \cdot \text{stages} \cdot d^2 \cdot N^2} \cdot \left[ Cp \cdot \left[ \left( \frac{Pcond}{Pevap} \right)^{\frac{(\gamma-1)}{\gamma}} - 1 \right] \cdot (Tevap + 460\, deg) \right],$$

where Pcond is a measured condenser pressure (psia), Pevap is a measured evaporator pressure (psia), Tevap is a saturated evaporator temperature (° F.), Cp is a specific heat of the refrigerant (BTU/ibm/° F.), y is a ratio of specific heats, stages is a number of centrifugal compressor stages, d is a mean diameter of the compressor stages (in), N is a centrifugal compressor speed (Hz) and $g_c$ is ~32.2 ft/sec. The above relationship can be simplified by defining $K_H$ as:

$$K_H = deltaH \cdot \frac{144 \cdot 778 \cdot 32.2}{\pi^2 \cdot stages \cdot d^2}$$

Thus, the pressure coefficient Pc can be defined by the relationship:

$$Pc = \frac{K_H}{N^2}$$

Figure 5:
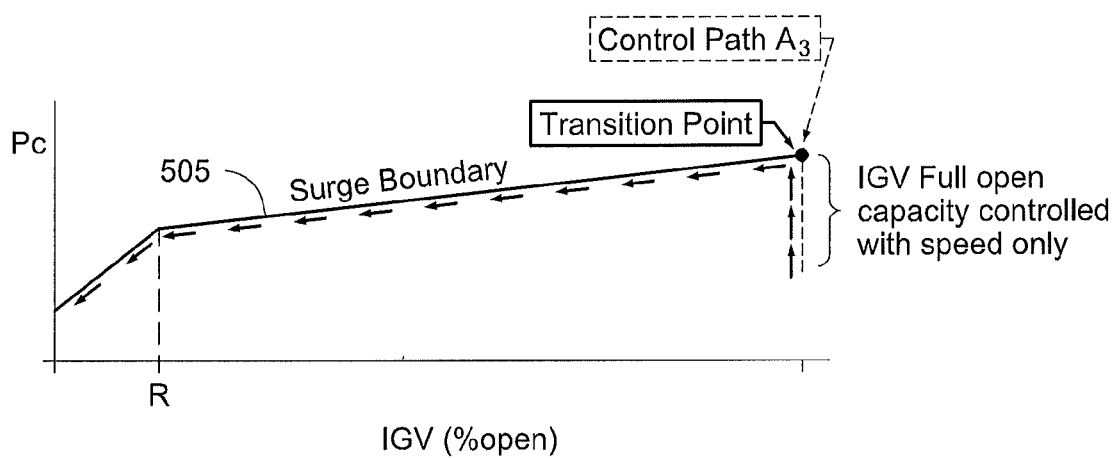
FIG. 5 illustrates a surge boundary curve along an inlet guide vane position versus a pressure coefficient plot.

For a given set of chiller system operating conditions, the pressure coefficient Pc can be set to the surge boundary by adjusting the centrifugal compressor speed. As shown in FIG. 5, the surge boundary (defined by a surge boundary curve PcBoundary 505) is generally not a fixed value, but can vary based on the inlet guide vane position. The surge boundary curve PcBoundary 505 shown in FIG. 5 can be defined by the relationships:

PcBoundary=$\alpha_1 \cdot$IGV+$\beta_1$ for IGV<R and

PcBoundary=$\alpha_2 \cdot$IGV+$\beta_2$ for IGV>R. In some embodiments, inlet guide position R can be about 12.5%.

Figure 6:
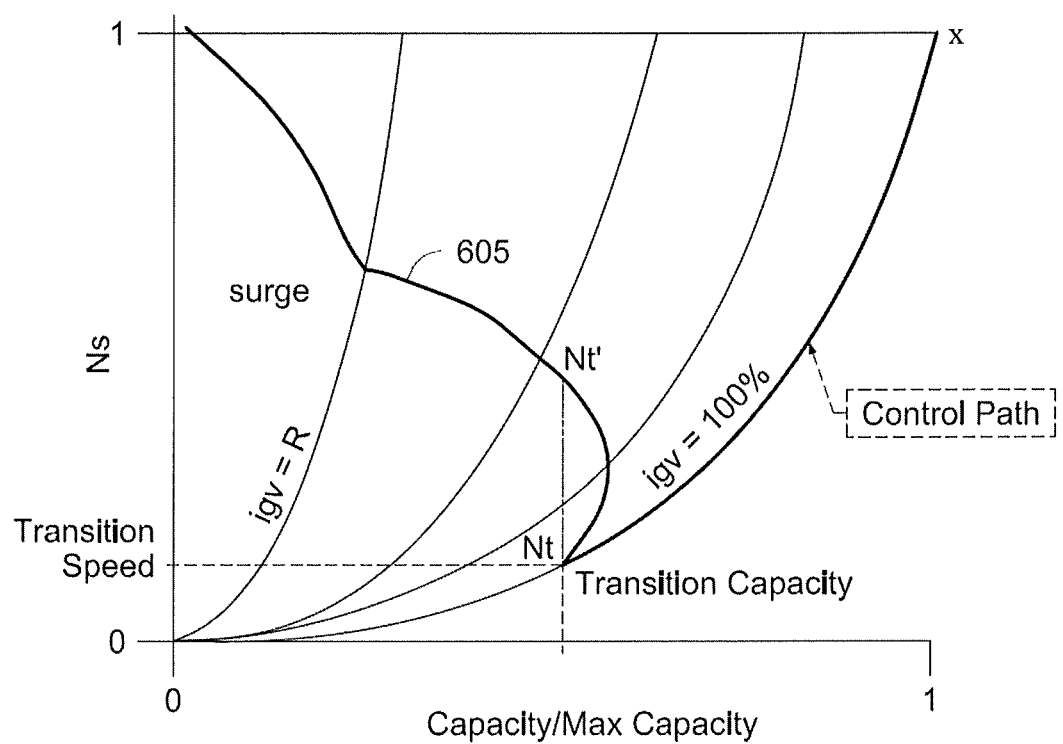
FIG. 6 illustrates a normalized surge curve along a normalized capacity versus normalized centrifugal compressor speed plot.

By combining the capacity model with the multi-actuator control model, a normalized surge curve along a normalized capacity versus normalized centrifugal compressor speed plot can be obtained (see FIG. 6).

As shown in FIG. 6, when the control path from a full capacity load x to a minimum capacity load is followed, a problem occurs at a transition point $N_t$. By following the control path shown in FIG. 5, holding the inlet guide vane completely open and reducing centrifugal compressor speed to decrease chiller capacity just below the transition point, the inlet guide vane position will start to close and the centrifugal compressor speed will be increased to follow surge boundary 505. However, as shown in FIG. 6, the capacity generated by the chiller system will actually increase until the inlet guide vanes close past the point $N_t$. Thus, there is a region where the chiller system may be trying to unload chiller capacity, but in actuality is causing an increase in the chiller capacity. An opposite effect occurs when the chiller capacity goes from a minimum load capacity to a full load capacity.

Figure 7:
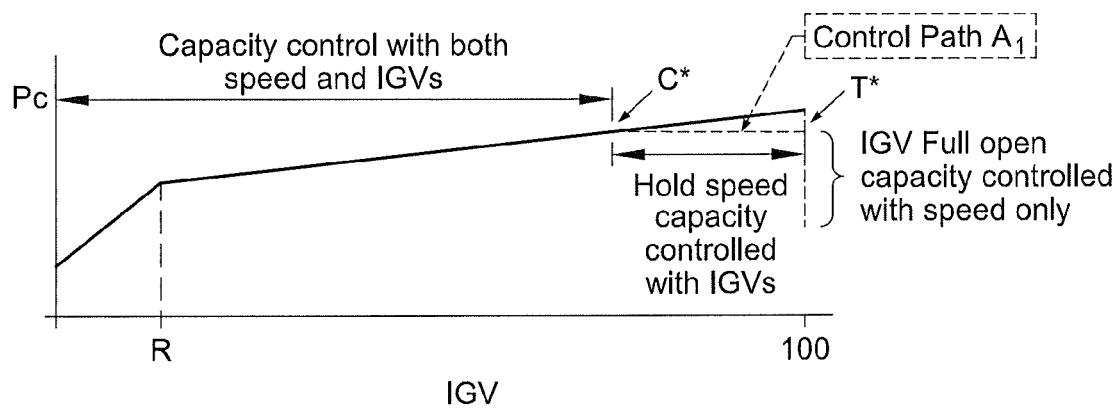
FIG. 7 illustrates a control path along an inlet guide position versus a pressure coefficient plot and a normalized capacity versus normalized centrifugal compressor speed plot, according to one embodiment.
Figure 7:
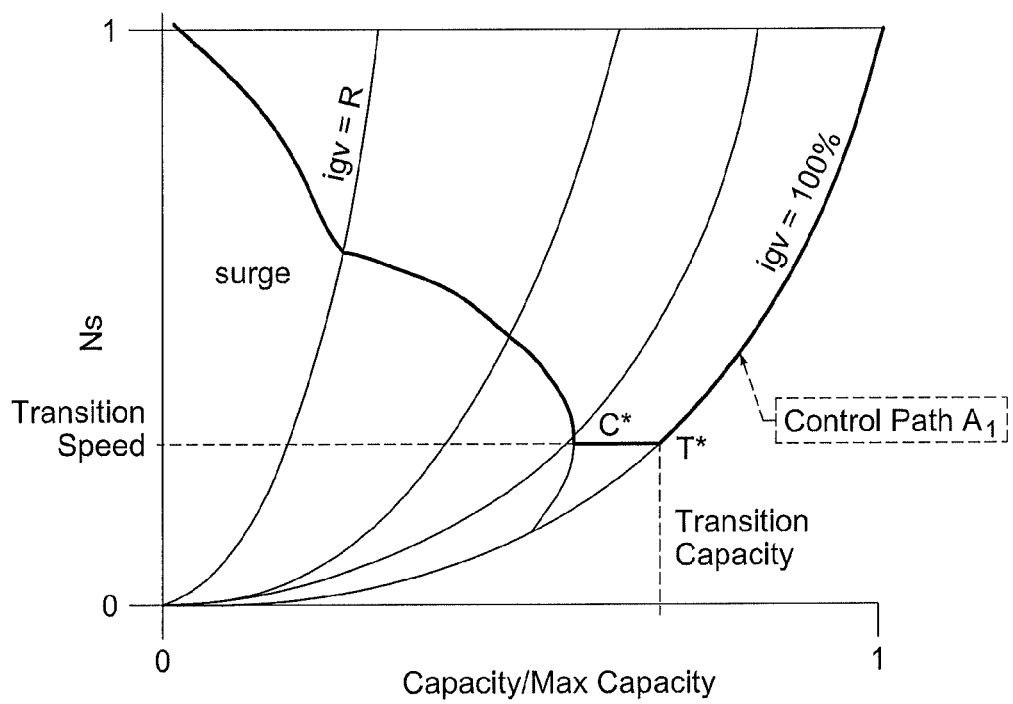

Accordingly, FIG. 7 provides a control path $A_1$ that can optimize efficiency while preventing surge. The control path $A_1$ provides a three stage control process for controlling the inlet guide vane position and the centrifugal compressor speed to achieve optimal efficiency while preventing surge.

Starting at a maximum desired normalized chiller capacity, the centrifugal compressor speed is set to a maximum centrifugal compressor speed and the inlet guide vane position is set to a fully open inlet guide vane position. As the desired normalized chiller capacity decreases, the centrifugal compressor speed is reduced while the inlet guide vane position remains at the fully open inlet guide vane position. When the desired normalized chiller capacity reaches a transition point T*, the centrifugal compressor speed remains constant while the inlet guide vane position is changed to reach the desired normalized chiller capacity. Accordingly, by keeping the centrifugal compressor speed constant and only changing the inlet guide vane position when the desired normalized chiller capacity drops below the transition point T*, large actuator changes at the transition point T* can be avoided thereby maintaining optimum efficiency of the chiller system. When the desired normalized chiller capacity drops below inflection point C*, both the centrifugal compressor speed and the inlet guide vane position are changed to control the chiller capacity to the desired normalized chiller capacity. Accordingly, by varying both the centrifugal compressor speed and the inlet guide vane position once the desired normalized chiller capacity drops below inflection point C*, surge can be prevented. The transition point T* and the inflection point C* can be calculated based off the relationships provided to determine the capacity control model and the multi-actuator control model.

That is, as shown in FIG. 6, there is a sharp transition in surge boundary curve 605. When the chiller system is operating at the sharp transition, it is unable to immediately reduce capacity without causing surge. To follow the surge boundary curve 605 in a direction that will reduce capacity while avoiding surge, the chiller system can adjust both the centrifugal compressor speed and the inlet guide vane position to temporarily increase capacity. However, by avoiding the sharp transition by holding the centrifugal compressor speed constant and adjusting the inlet guide vane position to achieve the desired capacity, surge can be prevented while maintaining optimal efficiency.

Figure 8:
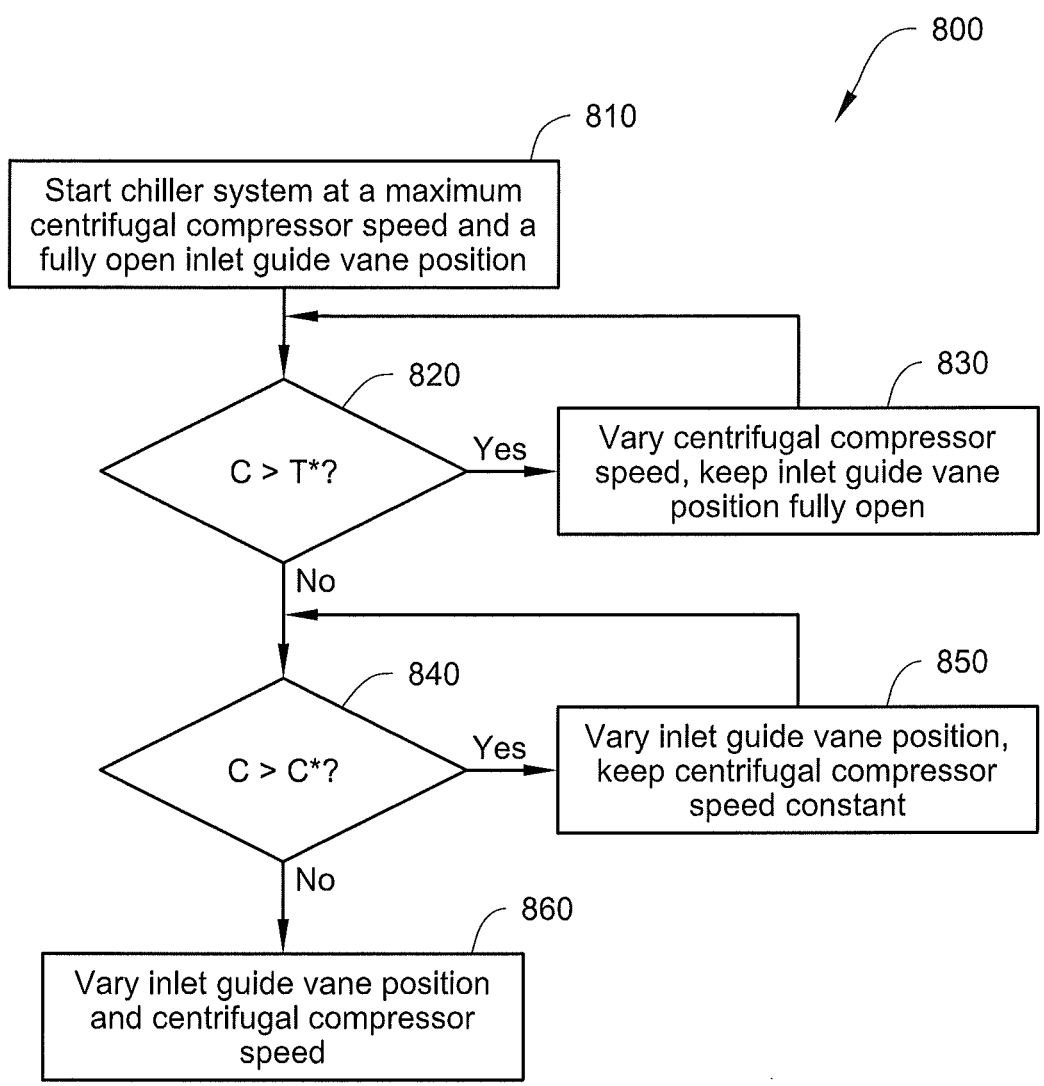
FIG. 8 illustrates a flowchart of a process for a multi-actuator control component to determine the centrifugal compressor speed and the inlet guide vane position, according to a first control path.

FIG. 8 illustrates a flowchart of a process 800 for the multi-actuator control component 220 to determine the centrifugal compressor speed and the inlet guide vane position, according to the control path $A_1$.

The process 800 begins at 810 whereby the chiller system initially starts with the centrifugal compressor speed set to a maximum centrifugal compressor speed and the inlet guide vane position set to a fully open inlet guide vane position. The process 800 then proceeds to 820.

At 820, the multi-actuator control component 220 determines whether the desired normalized chiller capacity C is greater than the transition point T*. If the multi-actuator control component 220 determines that the desired normalized chiller capacity C is greater than the transition point T*, then the process 800 proceeds to 830. If the multi-actuator control component 220 determines that the desired normalized chiller capacity C is not greater than the transition point T*, then the process 800 proceeds to 840.

At 830, the multi-actuator control component 220 is programmed to vary the centrifugal compressor speed to obtain the desired normalized chiller capacity C, while the inlet guide vane position is kept at the fully open inlet guide vane position. The process 800 then proceeds back to 820.

At 840, the multi-actuator control component 220 determines whether the desired normalized chiller capacity C is greater than the inflection point C*. If the multi-actuator control component 220 determines that the desired normalized chiller capacity C is greater than the inflection point C*, then the process 800 proceeds to 850. If the multi-actuator control component 220 determines that the desired normalized chiller capacity C is not greater than the inflection point C*, then the process 800 proceeds to 860.

At 850, the multi-actuator control component 220 is programmed to vary the inlet guide vane position to obtain the desired normalized chiller capacity C, while the centrifugal compressor speed is kept constant. The process 800 then proceeds back to 840.

At 860, the multi-actuator control component 220 is programmed to vary both the centrifugal compressor speed and the inlet guide vane position to obtain the desired normalized chiller capacity C.

Figure 9:
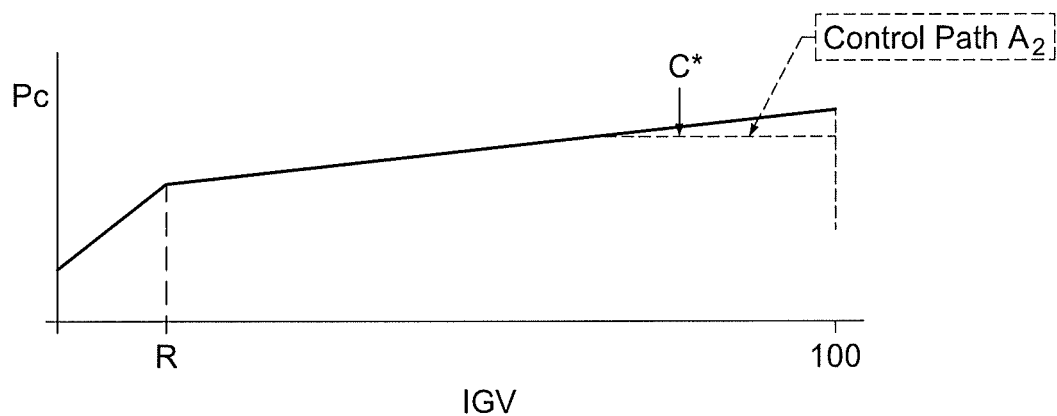
FIG. 9 illustrates a control path along an inlet guide position versus a pressure coefficient plot and a normalized capacity versus normalized centrifugal compressor speed plot, according to another embodiment.
Figure 9:
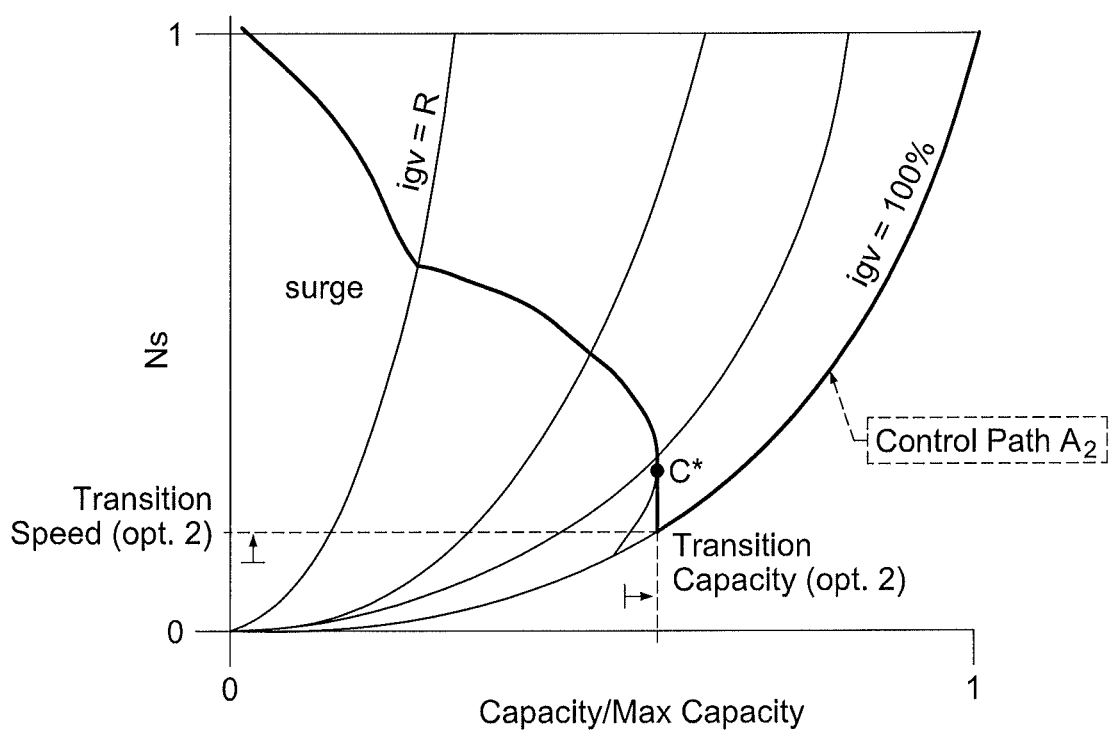

FIG. 9 provides another embodiment of a control path $A_2$ that can optimize efficiency while preventing surge. The control path $A_2$ provides a two stage control process for controlling the inlet guide vane position and the centrifugal compressor speed to achieve optimal efficiency while preventing surge.

Starting at a maximum desired normalized chiller capacity, the centrifugal compressor speed is set to a maximum centrifugal compressor speed and the inlet guide vane position is set to a fully open inlet guide vane position. As the desired normalized chiller capacity decreases, the centrifugal compressor speed is reduced while the inlet guide vane position remains at the fully open inlet guide vane position. When the desired normalized chiller capacity drops below an inflection point C*, both the centrifugal compressor speed and the inlet guide vane position are changed to control the chiller capacity to the desired normalized chiller capacity. Accordingly, by varying both the centrifugal compressor speed and the inlet guide vane position once the desired normalized chiller capacity drops below inflection point C*, surge can be prevented. The inflection point C* can be calculated based off the relationships provided to determine the capacity control model and the multi-actuator control model.

Figure 10:
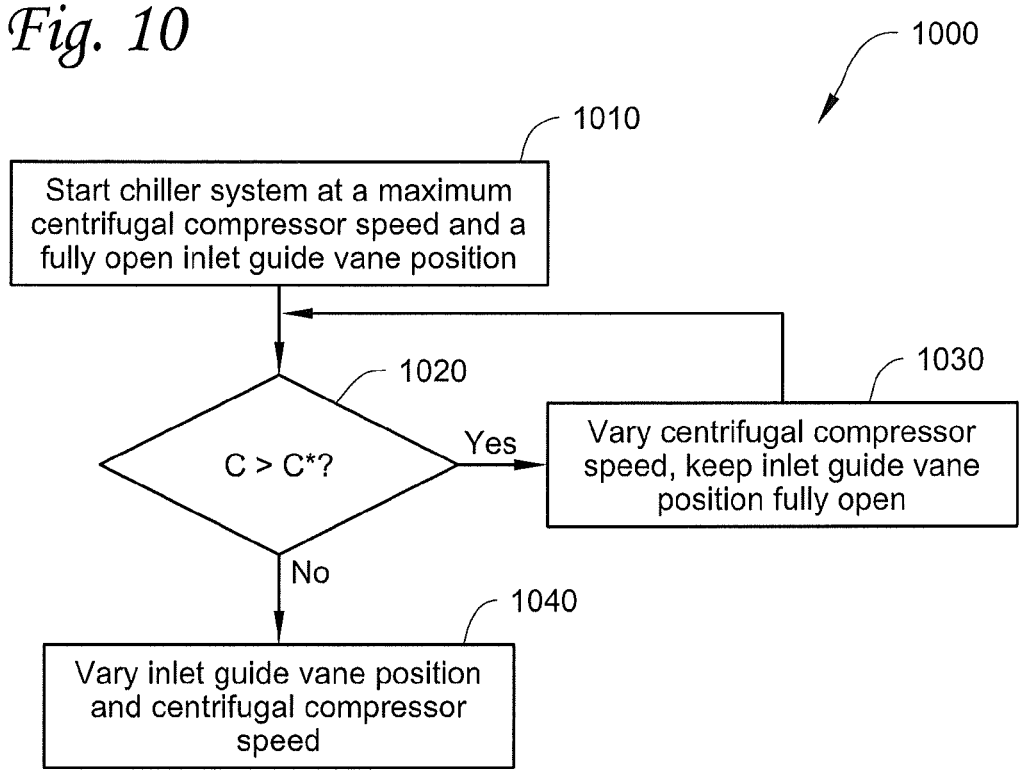
FIG. 10 illustrates a flowchart of a process for a multi-actuator control component to determine the centrifugal compressor speed and the inlet guide vane position, according to a second control path.

FIG. 10 illustrates a flowchart of a process 1000 for the multi-actuator control component 220 to determine the centrifugal compressor speed and the inlet guide vane position, according to the control path $A_2$.

The process 1000 begins at 1010 whereby the chiller system initially starts with the centrifugal compressor speed set to a maximum centrifugal compressor speed and the inlet guide vane position set to a fully open inlet guide vane position. The process 1000 then proceeds to 1020.

At 1020, the multi-actuator control component 220 determines whether the desired normalized chiller capacity C is greater than the inflection point C*. If the multi-actuator control component 220 determines that the desired normalized chiller capacity C is greater than the inflection point C*, then the process 1000 proceeds to 1030. If the multi-actuator control component 220 determines that the desired normalized chiller capacity C is not greater than the inflection point C*, then the process 1000 proceeds to 1040.

At 1030, the multi-actuator control component 220 is programmed to vary the centrifugal compressor speed to obtain the desired normalized chiller capacity C, while the inlet guide vane position is kept at the fully open inlet vane guide position. The process 1000 then proceeds back to 1020.

At 1040, the multi-actuator control component 220 is programmed to vary both the centrifugal compressor speed and the inlet guide vane position to obtain the desired normalized chiller capacity C.

Returning to FIG. 5, a control path $A_3$ is shown according to yet another embodiment. The control path $A_3$ provides a two stage control process for controlling the inlet guide vane position and the centrifugal compressor speed to achieve optimal efficiency.

Starting at a maximum desired normalized chiller capacity, the centrifugal compressor speed is set to a maximum centrifugal compressor speed and the inlet guide vane position is set to a fully open inlet guide vane position. As the desired normalized chiller capacity decreases, the centrifugal compressor speed is reduced while the inlet vane guide position remains at the fully open inlet vane guide position. When the desired normalized chiller capacity reaches a transition point T*, the inlet guide vane position is kept at the fully open inlet vane guide position while the centrifugal compressor speed is changed to reach the desired normalized chiller capacity. Accordingly, by keeping the position of the inlet guide vane at the fully open inlet vane guide position and only changing the centrifugal compressor speed when the desired normalized chiller capacity drops below the transition point T*, large actuator changes at the transition point T* can be avoided thereby maintaining optimum efficiency of the chiller system. The transition point T* can be calculated based off the relationships provided to determine the capacity control model and the multi-actuator control model.

Figure 11:
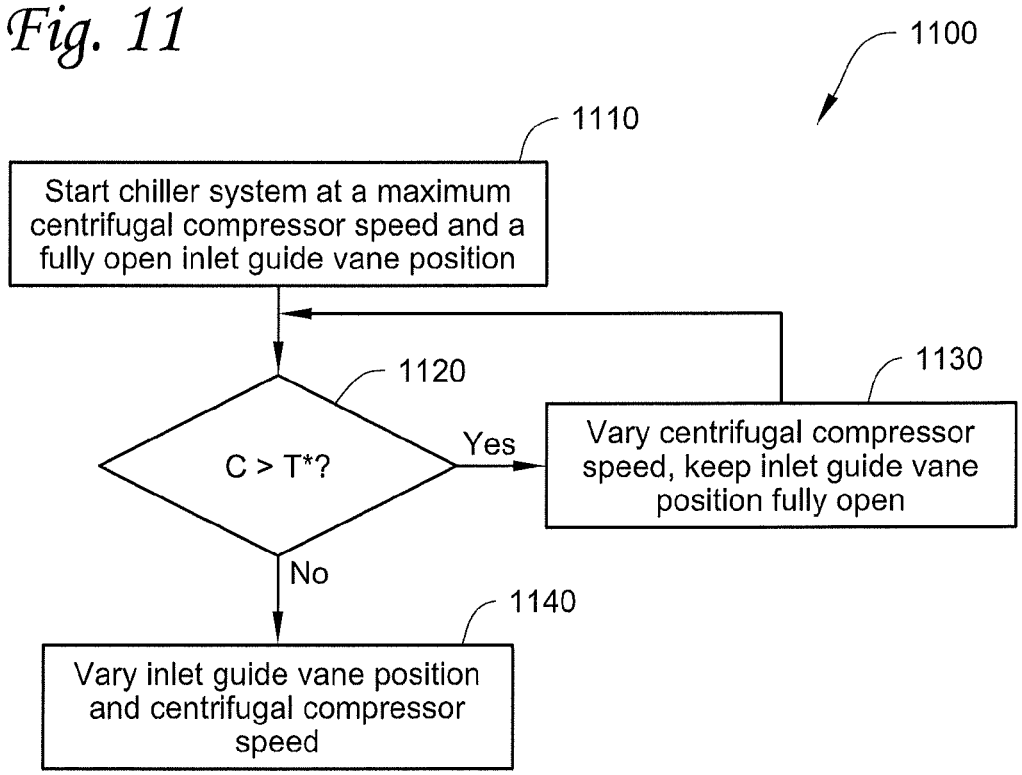
FIG. 11 illustrates a flowchart of a process for a multi-actuator control component to determine the centrifugal compressor speed and the inlet guide vane position, according to a third control path.

FIG. 11 illustrates a flowchart of a process 1100 for the multi-actuator control component 220 to determine the centrifugal compressor speed and the inlet guide vane position, according to the control path $A_3$ embodiment.

The process 1100 begins at 1110 whereby the chiller system initially starts with the centrifugal compressor speed set to a maximum centrifugal compressor speed and the inlet guide vane position set to a fully open inlet guide vane position. The process 1100 then proceeds to 1120.

At 1120, the multi-actuator control component 220 determines whether the desired normalized chiller capacity C is greater than the transition point T*. If the multi-actuator control component 220 determines that the desired normalized chiller capacity C is greater than the transition point T*, then the process 1100 proceeds to 1130. If the multi-actuator control component 220 determines that the desired normalized chiller capacity C is not greater than the transition point T*, then the process 1100 proceeds to 1140.

At 1130, the multi-actuator control component 220 is programmed to vary the centrifugal compressor speed to obtain the desired normalized chiller capacity C, while the inlet guide vane position is kept at the fully open inlet guide vane position. The process 1100 then proceeds back to 1120.

At 1140, the multi-actuator control component 220 is programmed to vary both the centrifugal compressor speed and the inlet guide vane position to obtain the desired normalized chiller capacity C.

Aspects:

It is noted that any of aspects 1-9 can be combined with any of aspects 10-18.

1. A method for controlling a chiller system that includes a centrifugal compressor with a variable speed drive, a chiller control unit and one or more inlet guide vanes, the method comprising:

the chiller control unit receiving first measurement data and second measurement data;

determining a desired chiller capacity based on the first measurement data;

determining a centrifugal compressor speed and an inlet guide vane position based on the second measurement data;

generating a compressor speed command and an inlet guide vane command based on the determined centrifugal compressor speed and the determined inlet guide vane position;

sending the compressor speed command to the variable speed drive of the centrifugal compressor and the inlet guide vane command to the centrifugal compressor to control the one or more inlet guide vanes.

2. The method of aspect 1, wherein the first measurement data includes at least one of an evaporator leaving water temperature data and an evaporator entering water temperature data.
3. The method of either of aspects 1 and 2, wherein the second measurement data includes at least one of the evaporator leaving water temperature data, an evaporator refrigerant temperature data, a condenser entering water temperature data, a condenser refrigerant pressure data, and the desired chiller capacity.
4. The method of any of aspects 1-3, wherein determining the centrifugal compressor speed and the inlet guide vane position based on the second measurement data includes:
   determining whether the desired chiller capacity is greater than a transition point;
   adjusting a centrifugal compressor speed to achieve the desired chiller capacity and setting an inlet guide vane position to a fully open inlet guide vane position when the desired chiller capacity is greater than the transition point;
   determining whether the desired chiller capacity is greater than an inflection point when the desired chiller capacity is not greater than the transition point;
   adjusting the inlet guide vane position to obtain the desired chiller capacity while the centrifugal compressor speed is kept constant when the desired chiller capacity is greater than the inflection point; and
   adjusting both the inlet guide vane position and the centrifugal compressor speed to obtain the desired chiller capacity when the desired chiller capacity is not greater than the inflection point.
5. The method of aspect 4, further comprising initially starting the chiller system with the centrifugal compressor speed set at a maximum centrifugal compressor speed and an inlet guide vane position to the fully open inlet guide vane position.
6. The method of any of aspects 1-3, wherein determining the centrifugal compressor speed and the inlet guide vane position based on the second measurement data includes:
   determining whether the desired chiller capacity is greater than an inflection point;
   adjusting a centrifugal compressor speed to achieve the desired chiller capacity and setting an inlet guide vane position to a fully open inlet guide vane position when the desired chiller capacity is greater than the inflection point; and
   adjusting both the inlet guide vane position and the centrifugal compressor speed to obtain the desired chiller capacity when the desired chiller capacity is not greater than the inflection point.
7. The method of aspect 6, further comprising initially starting the chiller system with the centrifugal compressor speed set at a maximum centrifugal compressor speed and an inlet guide vane position to the fully open inlet guide vane position.
8. The method of any of aspects 1-3, wherein determining the centrifugal compressor speed and the inlet guide vane position based on the second measurement data includes:
   determining whether the desired chiller capacity is greater than a transition point;
   adjusting a centrifugal compressor speed to achieve the desired chiller capacity and setting an inlet guide vane position to a fully open inlet guide vane position when the desired chiller capacity is greater than the transition point; and
   adjusting both the inlet guide vane position and the centrifugal compressor speed to obtain the desired chiller capacity when the desired chiller capacity is not greater than the transition point.
9. The method of aspect 8, further comprising initially starting the chiller system with the centrifugal compressor speed set at a maximum centrifugal compressor speed and an inlet guide vane position to the fully open inlet guide vane position.
10. A chiller system comprising:
    a centrifugal compressor with a variable speed drive;
    one or more inlet guide vanes; and
    a chiller control unit that includes a capacity control component configured to receive first measurement data and determine a desired chiller capacity based on the first measurement data, and a multi-actuator control component configured to receive second measurement data and determine a centrifugal compressor speed and an inlet guide vane position based on the second measurement data,
    wherein the chiller control unit is configured to generate and send a centrifugal compressor speed command to the variable speed drive of the centrifugal compressor based on the determined centrifugal compressor speed and configured to generate and send an inlet guide vane position command to the centrifugal compressor to control the one or more inlet guide vanes based on the determined inlet guide vane position.
11. The chiller system of aspect 10, wherein the first measurement data includes at least one of an evaporator leaving water temperature data and an evaporator entering water temperature data.
12. The chiller system of either of aspects 10 and 11, wherein the second measurement data includes at least one of the evaporator leaving water temperature data, an evaporator refrigerant temperature data, a condenser entering water temperature data, a condenser refrigerant pressure data, and the desired chiller capacity.
13. The chiller system of any of aspects 10-12, wherein the multi-actuator control component is configured to:
    determine whether the desired chiller capacity is greater than a transition point;
    adjust a centrifugal compressor speed to achieve the desired chiller capacity and set an inlet guide vane position to a fully open inlet guide vane position when the desired chiller capacity is greater than the transition point;
    determine whether the desired chiller capacity is greater than an inflection point when the desired chiller capacity is not greater than the transition point;
    adjust the inlet guide vane position to obtain the desired chiller capacity while the centrifugal compressor speed is kept constant when the desired chiller capacity is greater than the inflection point; and
    adjust both the inlet guide vane position and the centrifugal compressor speed to obtain the desired chiller capacity when the desired chiller capacity is not greater than the inflection point.
14. The chiller system of aspect 13, wherein the multi-actuator control component is configured to initially start the chiller system with the centrifugal compressor speed set at a maximum centrifugal compressor speed and an inlet guide vane position to the fully open inlet guide vane position.
15. The chiller system of any of aspects 10-12, wherein the multi-actuator control component is configured to:
    determine whether the desired chiller capacity is greater than an inflection point;

adjust a centrifugal compressor speed to achieve the desired chiller capacity and set an inlet guide vane position to a fully open inlet guide vane position when the desired chiller capacity is greater than the inflection point; and adjust both the inlet guide vane position and the centrifugal compressor speed to obtain the desired chiller capacity when the desired chiller capacity is not greater than the inflection point.

16. The chiller system of aspect 15, wherein the multi-actuator control component is configured to initially start the chiller system with the centrifugal compressor speed set at a maximum centrifugal compressor speed and an inlet guide vane position to the fully open inlet guide vane position.

17. The chiller system of any of aspects 10-12, wherein the multi-actuator control component is configured to:

determine whether the desired chiller capacity is greater than a transition point;

adjust a centrifugal compressor speed to achieve the desired chiller capacity and set an inlet guide vane position to a fully open inlet guide vane position when the desired chiller capacity is greater than the transition point; and adjust both the inlet guide vane position and the centrifugal compressor speed to obtain the desired chiller capacity when the desired chiller capacity is not greater than the transition point.

18. The chiller system of aspect 17, wherein the multi-actuator control component is configured to initially start the chiller system with the centrifugal compressor speed set at a maximum centrifugal compressor speed and an inlet guide vane position to the fully open inlet guide vane position.

While only certain features of the embodiments have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A method for controlling a chiller system that includes a centrifugal compressor with a variable speed drive, a chiller control unit and one or more inlet guide vanes, the method comprising:

the chiller control unit receiving first measurement data and second measurement data, wherein the second measurement data includes a condenser entering water temperature data and a condenser refrigerant pressure data;

a capacity control component of the chiller control unit determining a desired chiller capacity based on the first measurement data, wherein the desired chiller capacity is indicative of a load demanded on the chiller system; and a multi-actuator control component of the chiller control unit determining a centrifugal compressor speed and an inlet guide vane position based on the second measurement data;

determining a normalized chiller capacity based on the desired chiller capacity; determining a normalized centrifugal compressor speed based on the centrifugal compressor speed;

determining a pressure coefficient that represents a static pressure and a kinetic energy of the centrifugal compressor;

determining an inflection point based on the normalized chiller capacity, the normalized centrifugal compressor speed, and the pressure coefficient;

determining an adjusted centrifugal compressor speed and an adjusted inlet guide vane position based on the normalized chiller capacity, the normalized centrifugal compressor speed and the pressure coefficient;

wherein the chiller control unit generates a compressor speed command and an inlet guide vane command based on the adjusted centrifugal compressor speed and the adjusted inlet guide vane position; and sends the compressor speed command to the variable speed drive of the centrifugal compressor and the inlet guide vane command to the centrifugal compressor to control the one or more inlet guide vanes; and wherein determining the adjusted centrifugal compressor speed and the adjusted inlet guide vane position includes:

determining whether the desired chiller capacity is greater than the inflection point;

adjusting the centrifugal compressor speed to achieve the desired chiller capacity and setting the inlet guide vane position to a fully open inlet guide vane position when the desired chiller capacity is greater than the inflection point; and adjusting both the inlet guide vane position and the centrifugal compressor speed to obtain the desired chiller capacity when the desired chiller capacity is not greater than the inflection point.

2. The method of claim 1, wherein the first measurement data includes at least one of an evaporator leaving water temperature data and an evaporator entering water temperature data.

3. The method of claim 1, wherein the second measurement data further includes at least one of an evaporator leaving water temperature data, an evaporator refrigerant temperature data, and the desired chiller capacity.

4. The method of claim 1, wherein the second measurement data also includes an evaporator leaving water temperature data, an evaporator refrigerant temperature data, and the desired chiller capacity, and the method further including:

determining the centrifugal compressor speed and the inlet guide vane position based on the evaporator leaving water temperature data, the evaporator refrigerant temperature data, and the desired chiller capacity.

5. A chiller system comprising:

a centrifugal compressor with a variable speed drive;

one or more inlet guide vanes; and a chiller control unit that includes:

a capacity control component configured to receive first measurement data and determine a desired chiller capacity based on the first measurement data, wherein the desired chiller capacity is indicative of a load demanded on the chiller system, and a multi-actuator control component configured to:

receive second measurement data that includes a condenser entering water temperature data and a condenser refrigerant pressure data, determine a centrifugal compressor speed and an inlet guide vane position based on the condenser entering water temperature data and the condenser refrigerant pressure data, determine a normalized chiller capacity based on the desired chiller capacity;

determine a normalized centrifugal compressor speed based on the centrifugal compressor speed;

determine a pressure coefficient that represents a static pressure and a kinetic energy of the centrifugal compressor;

determine an inflection point based on the normalized chiller capacity, the normalized centrifugal compressor speed, and the pressure coefficient;

determine an adjusted centrifugal compressor speed and an adjusted inlet guide vane position based on the normalized chiller capacity, the normalized centrifugal compressor speed and the pressure coefficient;

wherein the chiller control unit is configured to generate and send a centrifugal compressor speed command to the variable speed drive of the centrifugal compressor based on the adjusted centrifugal compressor speed and configured to generate and send an inlet guide vane position command to the centrifugal compressor to control the one or more inlet guide vanes based on the adjusted inlet guide vane position;

wherein the multi-actuator control component is configured to:

determine whether the desired chiller capacity is greater than an inflection point;

adjust a centrifugal compressor speed to achieve the desired chiller capacity and set an inlet guide vane position to a fully open inlet guide vane position when the desired chiller capacity is greater than the inflection point; and adjust both the inlet guide vane position and the centrifugal compressor speed to obtain the desired chiller capacity when the desired chiller capacity is not greater than the inflection point.

6. The chiller system of claim 5, wherein the first measurement data includes at least one of an evaporator leaving water temperature data and an evaporator entering water temperature data.

7. The chiller system of claim 5, wherein the second measurement data further includes at least one of an evaporator leaving water temperature data, an evaporator refrigerant temperature data and the desired chiller capacity.

8. The chiller system of claim 5, wherein the multi-actuator control component is configured to receive an evaporator leaving water temperature data, an evaporator refrigerant temperature data, and the desired chiller capacity and configured to determine the centrifugal compressor speed and the inlet guide vane position based on the evaporator leaving water temperature data, the evaporator refrigerant temperature data, and the desired chiller capacity.

9. A method for controlling a chiller system that includes a centrifugal compressor with a variable speed drive, a chiller control unit and one or more inlet guide vanes, the method comprising:

the chiller control unit receiving first measurement data and second measurement data, wherein the second measurement data includes at least one of a condenser entering water temperature data and a condenser refrigerant pressure data;

a capacity control component of the chiller control unit determining a desired chiller capacity based on the first measurement data, wherein the desired chiller capacity is indicative of a load demanded on the chiller system; and a multi-actuator control component of the chiller control unit determining a centrifugal compressor speed and an inlet guide vane position based on the second measurement data;

determining a normalized chiller capacity based on the desired chiller capacity; determining a normalized centrifugal compressor speed based on the centrifugal compressor speed;

determining a pressure coefficient that represents a static pressure and a kinetic energy of the centrifugal compressor;

determining an inflection point based on the normalized chiller capacity, the normalized centrifugal compressor speed, and the pressure coefficient;

determining an adjusted centrifugal compressor speed and an adjusted inlet guide vane position based on the normalized chiller capacity, the normalized centrifugal compressor speed and the pressure coefficient;

wherein the chiller control unit generates a compressor speed command and an inlet guide vane command based on the adjusted centrifugal compressor speed and the adjusted inlet guide vane position; and sends the compressor speed command to the variable speed drive of the centrifugal compressor and the inlet guide vane command to the centrifugal compressor to control the one or more inlet guide vanes; and wherein determining the adjusted centrifugal compressor speed and the adjusted inlet guide vane position includes:

determining whether the desired chiller capacity is greater than the inflection point;

adjusting the centrifugal compressor speed to achieve the desired chiller capacity and setting the inlet guide vane position to a fully open inlet guide vane position when the desired chiller capacity is greater than the inflection point; and adjusting both the inlet guide vane position and the centrifugal compressor speed to obtain the desired chiller capacity when the desired chiller capacity is not greater than the inflection point.

* * * * *